(12) United States Patent  (10) Patent No.: US 7,581,886 B2
Nitti  (45) Date of Patent: Sep. 1, 2009

(54) SHIPPING BAG REVERSIBLE INTO A TOTE

(75) Inventor: Robert Anthony Nitti, Appomattox, VA (US)

(73) Assignee: Boss Licensing Group, Inc., Appomattox, VA (US)

( * ) Notice: Subject to any disclaimer, the term of this patent is extended or adjusted under 35 U.S.C. 154(b) by 735 days.

(21) Appl. No.: 11/162,811

(22) Filed: Sep. 23, 2005

(65) Prior Publication Data

US 2007/0071364 A1  Mar. 29, 2007

(51) Int. Cl.
*B65D 30/00* (2006.01)
(52) U.S. Cl. ............................. 383/4; 383/14; 383/109; 383/200; 383/98
(58) Field of Classification Search ..................... 383/4, 383/109, 93, 120, 117, 14, 30, 31, 38, 200, 383/98; 150/103; 229/68.2
See application file for complete search history.

(56) References Cited

U.S. PATENT DOCUMENTS

| | | | | |
|---|---|---|---|---|
| 3,109,474 A | * | 11/1963 | Levi | 150/158 |
| 3,630,798 A | * | 12/1971 | Wicks | 493/188 |
| 3,818,963 A | * | 6/1974 | Whitman | 383/40 |
| 4,301,849 A | * | 11/1981 | Litwack et al. | 150/103 |
| 4,681,781 A | | 7/1987 | Murray | 428/35 |
| 4,750,609 A | * | 6/1988 | Felis | 206/1.7 |
| 5,047,001 A | * | 9/1991 | Willis | 493/267 |
| 5,370,461 A | * | 12/1994 | Smith et al. | 383/4 |
| 5,399,020 A | * | 3/1995 | Cheng | 383/4 |
| 5,653,337 A | | 8/1997 | Cirigliano | 206/373 |
| 5,670,274 A | * | 9/1997 | Forrer | 429/187 |
| 5,676,466 A | | 10/1997 | Lindenbeck | 383/5 |
| 5,692,660 A | * | 12/1997 | Stewart | 224/581 |
| 5,817,379 A | * | 10/1998 | Rich et al. | 428/35.2 |
| 6,109,440 A | | 8/2000 | Cliff | 206/523 |
| 7,106,202 B2 | * | 9/2006 | Dickinson | 340/572.8 |

* cited by examiner

*Primary Examiner*—Nathan J Newhouse
*Assistant Examiner*—Devin Salmon
(74) *Attorney, Agent, or Firm*—Louis Ventre, Jr.

(57) ABSTRACT

A plastic-coated fabric shipping bag, which after use for shipping an item in commerce, can be turned inside out and transformed into a re-usable, plastic-lined, fabric tote bag.

10 Claims, 3 Drawing Sheets

SHIPPING BAG REVERSIBLE INTO A TOTE

FIELD OF INVENTION

This invention relates to the field of flexible bags used for shipping products in which the bag may be reversed to provide a durable, plastic-lined, textile tote bag for continued use by the recipient and serving to reduce shipping waste and generate good will towards the shipper.

DESCRIPTION OF PRIOR ART

Commerce of the United States depends to a large extent on shipping products to the consumer. Whether by United States mail or by one of the contract parcel carriers, many businesses respond to orders from consumers by placing the items ordered in a box or shipping bag and sending it to the consumer. While inexpensive, a shipping bag of this kind has no value after it is employed for shipping, it immediately adds to the stream of disposable consumer garbage, and is of little value to the shipper after it is discarded.

It is an object of the present invention to provide a durable shipping bag that retains value in the eye of the recipient after it is received, that promotes retention and use of the bag by the recipient, and that generates good will towards the shipper either in the form of an advertising for the shipper, or simply by the recipient's use of the bag.

While the prior art teaches one or another of these objects, or variations of them, none has been found to capture all of these objects in a flexible shipping bag.

For example, bags have been described for improved puncture and snag resistance. U.S. Pat. No. 4,681,781 is an example of this. It teaches a thermoplastic shipping bag with walls of cross-laminated sheets of uni-axially oriented polyethylene bonded together.

In contrast, rather than cross-laminated sheets, the present invention obtains a durable bag by joining a plastic to a textile or fabric so that the outer surface of the shipping bag, is a washable plastic which is given added durability by having a fabric inside. Then, after it is delivered, the recipient pulls it inside out so that a clean fabric surface is on the outside and the plastic surface is fully contained on the inside.

The prior art teaches multiple use and recyclable shipping bags, which are objects known to help reduce waste, promote conservation of resources and retain value to the user. U.S. Pat. No. 5,676,466 is an example, which teaches a compartment for goods to be mailed between the transparent layer and the back wall, and on the front side, the shipping bag can be closed simply by inserting or introducing the closure flap. This invention enables multiple use of the bag for shipping.

The present invention permits multiple use of the bag, but not for shipping. Rather, it is better described as permitting multiple uses of the bag, thereby increasing its value to the recipient and promoting conservation of resources. In addition, the present invention increases the value to the shipper because his logo, or other advertising, can be printed on the fabric side as a reminder of its source and, even in the absence of advertising, it is a favorable reminder of the vendor each time it is used as a tote bag. Finally, retention of the bag as a tote bag means that the bag is not simply thrown away after it is received. This helps to reduce waste.

An example is prior art teaching conversion of a tote bag into a shipping bag. U.S. Pat. No. 5,370,461 describes a bag suitable for carrying and also shipping printed materials and other items. The bag provides a handle while allowing items to be placed into or removed from the interior of the bag. For shipping, the handles are tucked inside and an exterior flap is used to seal it. A label is then added and the bag becomes a shipping bag.

While superficially similar by the combination of a tote and a shipping bag, the '461 patent is significantly different from the present invention. In the first instance, the '461 patent starts out as a carrying bag and is then sealed and used as a shipping bag. It is very similar to carrying a plastic envelope with handles. In its preferred use, the '461 bag does not originate with a vendor, but rather is intended to permit an attendee of a conference to collect conference literature and mail it to himself.

In contrast, the present invention starts out as a durable shipping bag in the form of a plastic coated fabric bag. The bag starts out with a vendor, not the recipient, and this is important because it is a means of advertising the vendor and generating good will towards the vendor.

Secondly, the '461 patent describes a bag intended to be used and then discarded. It has no lasting value after it is used for shipping. In contrast, the present invention permits the recipient to have continuing use after shipment as a fabric tote with a plastic inner lining. The recipient turns the shipping bag inside out and the bag is converted to a fabric tote bag with a plastic inner lining, which adds protection against stains from any damp or wet contents subsequently carried in the tote. Continuing use of the bag is a significant utility of the present invention, which is not taught in the prior art. Continuing use also serves the purpose of limiting waste related to shipping.

It is therefore apparent that a need exists for a durable shipping bag that possesses greater utility than a shipping bag; that is, one that can be easily converted into a useful consumer product, a tote bag, after it is employed as a shipping bag.

BRIEF SUMMARY OF THE INVENTION

A flexible shipping bag, which after use for shipping an item in commerce, can be turned inside out and transformed into a re-usable, plastic-lined, fabric tote bag.

DETAILED DESCRIPTION OF THE INVENTION

Figure 1:
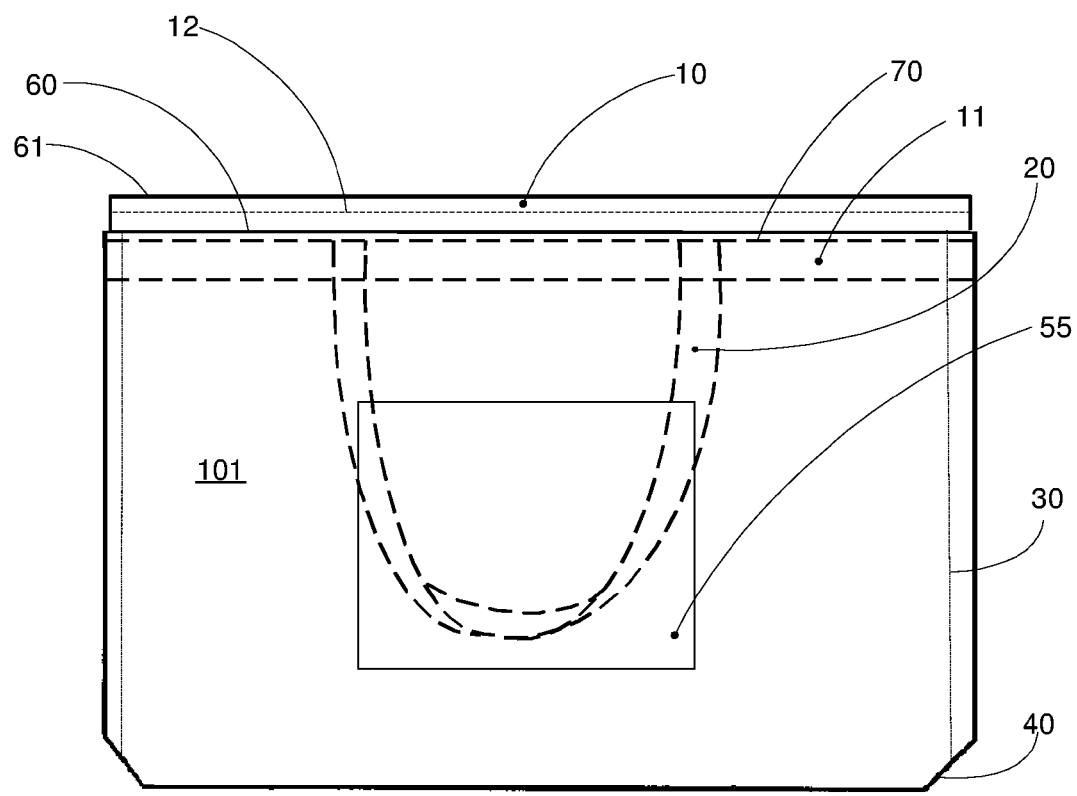
FIG. 1 is a front view of the shipping bag.
Figure 2:
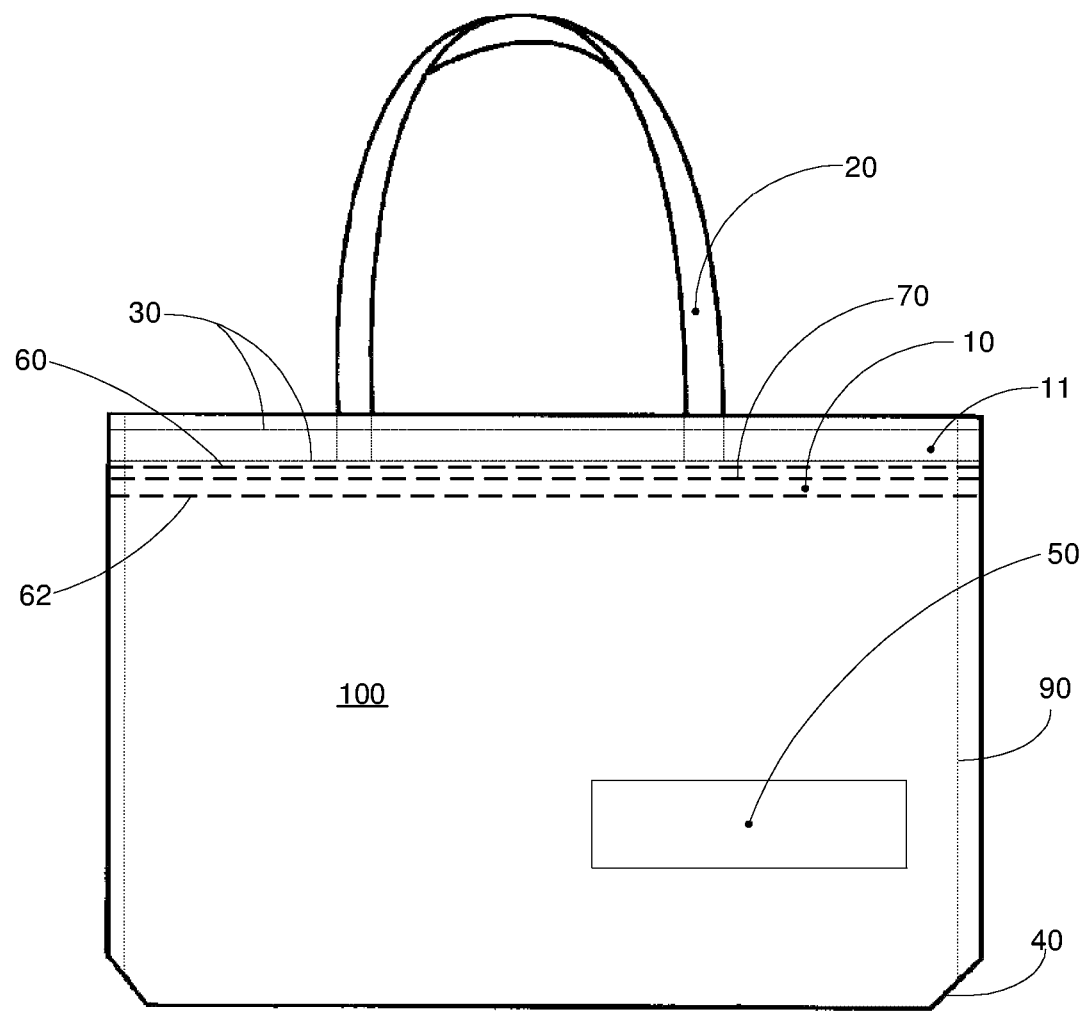
FIG. 2 is a front view of the tote bag.
Figure 3:
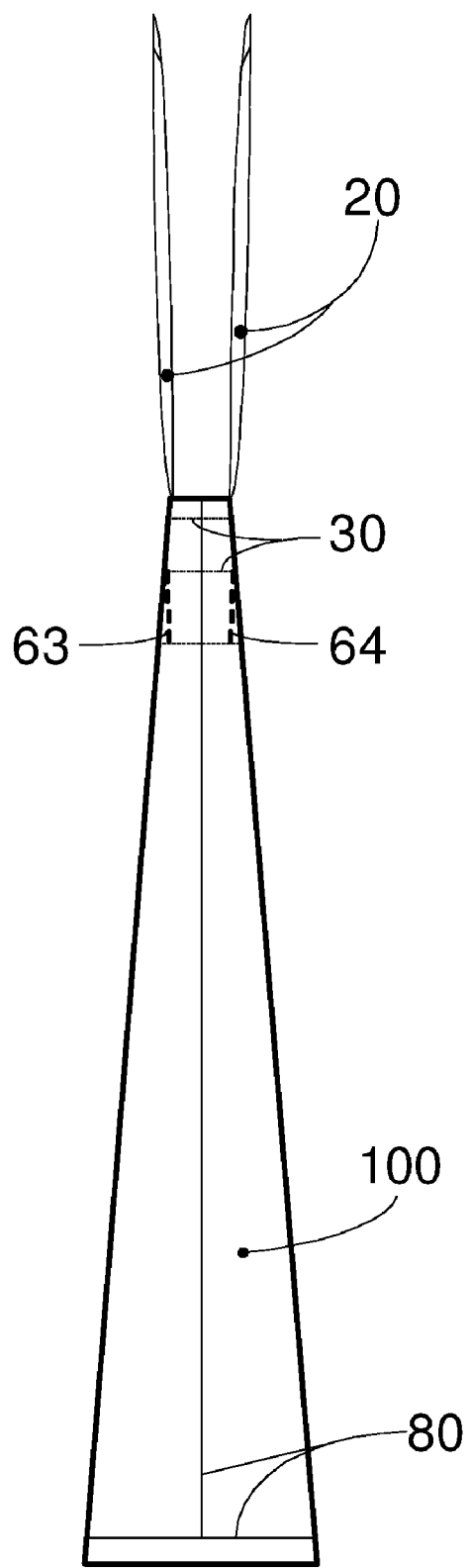
FIG. 3 is a side view of the tote bag.

FIG. 1 shows a flexible shipping bag (101), which is convertible to a tote bag (100) shown in FIGS. 2 and 3. FIG. 1 shows a front view of the shipping bag (101) and, when pulled inside out, FIG. 2 shows a tote bag (100). The shipping bag is openable at the top (61) as is the tote bag.

The shipping bag has an external wall of plastic, which covers the entire exterior of the shipping bag, except for the sealing flaps (10), which have a textile exterior (hereinafter fabric) and a plastic interior wall. The fabric may be any sturdy material from which tote bags are commonly made. The plastic is joined to the fabric by stitching (30), but may also be mated by glue or other techniques well known in the art. In the preferred embodiment, the shipping bag is made with a bottom gusset (40) of a kind commonly used in order to provide more room in the bag for bulky items.

Two sealing flaps (10) are affixed at the top of the front and rear walls of the bag. The sealing flaps are made of fabric on the outside wall and have a plastic lining on the inside wall.

This plastic lining provides a surface amenable to attaching a peel and stick self adhesive strip to one of the sealing flaps and also promoting the seal of the front and rear flaps to each other to close the bag for shipping.

In the preferred embodiment, the peel and stick self adhesive strip is of a kind commonly used in the industry having an outer facing sticky surface covered by one or more removable tabs. Once the tabs are removed, the bag is sealed by pressing the front sealing-flap to the rear sealing-flap. In alternative embodiments, the flaps may be stapled together or affixed by other well-known methods of closing a shipping bag.

In the preferred embodiment, the peel and stick self adhesive strip is applied at the top-most position on one of the sealing flaps so that the recipient of the package can cut along a printed line (12) to easily open the package and cut off the peel and stick self adhesive strip. Cutting the sealing flaps is not, however, essential, as a recipient can simply pull the sealing flaps apart. When the recipient converts the bag to a tote bag by pulling it inside out, any remaining sealing flap is folded along its bottom edge (60) into the bag and is thereafter invisible to an external viewer.

Immediately below the sealing flaps on the front and rear walls and on the inside of the shipping bag are tote flaps (11). The tote flap provides the uppermost segment of the tote bag once the shipping bag is turned inside out. The top edge (70) of the tote flap is the folded over end of the fabric that makes up the external wall of the tote bag and provides a band of reinforced fabric of double thickness to attach the handles (20) of the tote bag to the front and rear walls. The handles are also made of fabric straps of the same material as the inner wall of the shipping bag. In alternative embodiments, the handles may be made of polypropylene, any convenient material. In FIG. 1, the handles are shown in the stowed position within the shipping bag.

FIG. 1 also shows a shipping label (55) that would be attached in the normal process of shipping.

FIG. 2 shows the tote bag (100), which is the shipping bag turned inside out. The tote bag is shown with the handles (20) outside of the tote bag in the position they would be in during normal use of a tote bag. Stitching (30) holds the folded over ends of the fabric securing and constituting the tote flaps (11) on the front and rear walls of the tote bag. Immediately below the tote flaps on the inside of the bag are the sealing flaps, which are not visible from the outside of the tote bag. The top edge (60) and bottom edge (62) of the sealing flaps are shown with dotted lines. Stitching (90) on the inside of the tote bag at the sides is invisible on the exterior of the tote bag.

The preferred embodiment of the tote bag has a logo (50) of the shipper to carry a reminder of the source of the bag. Other embodiments may include other advertising or no advertising at all. Placement of such advertising may be on the handles or at such other location as is displayed when the tote bag is used.

FIG. 3 shows a side view of the tote bag (100). The seams (80) created by internal stitching span the bottom gusset and extend to the top of the tote bag. The handles (20) are shown on both the front wall and the rear wall of the tote bag. The ends of the sealing flaps in their stowed position on the inside of the tote bag are indicated by doted lines (63) and (64). The stitching (30) securing the tote flap traverses the entire circumference of the tote bag.

While there has been described herein what is considered to be the preferred exemplary embodiment of the present invention, other modifications of the present invention shall be apparent to those skilled in the art from the teachings herein, and it is therefore, desired to be secured in the appended claim all such modifications as fall within the true spirit and scope of the invention. Accordingly, what is desired to be secured by Letters Patent of the United States is the invention as defined and differentiated in the claims that follow.

What is claimed is:

1. A flexible shipping bag having an open top and configured to be turned inside out to form a tote bag, the shipping bag comprising:
   sealing flaps comprising a fabric outside wall and a plastic lining on an inside wall, wherein each sealing flap is configured with a bottom edge which, when the shipping bag is turned inside out, permits folding the sealing flap into the bag and thereby remains invisible to an external viewer;
   tote flaps positioned immediately below the sealing flaps on the inside of the shipping bag, wherein the tote flaps are configured to unfold and form the uppermost segment of the tote bag when the shipping bag is turned inside out;
   a plastic outer wall configured to cover the exterior of the shipping bag except for the sealing flaps;
   a fabric inside wall joined to the plastic outer wall by stitching; and,
   inner handles attached to the tote flaps.

2. The flexible shipping bag of claim 1 wherein the tote flaps are further configured to provide a band of reinforced fabric to attach inner handles.

3. The flexible shipping bag of claim 1 wherein the inner handles are made of the same material as the fabric inside wall.

4. The process of using the shipping bag of claim 1 comprising the steps of placing an item to be shipped into said shipping bag; sealing said shipping bag by joining said sealing flaps; adding a shipping label to said shipping bag and shipping said shipping bag.

5. The process of using the shipping bag of claim 1 comprising the steps of taking delivery of said shipping bag; opening said shipping bag; removing any contents of said shipping bag; turning said shipping bag inside out to convert said shipping bag to a tote bag; folding the sealing flap into the bag such that it is invisible to an external viewer; and, unfolding the tote flaps to provide the uppermost segment of the tote bag.

6. The flexible shipping bag of claim 1 further comprising advertising displayed when said shipping bag is turned inside out.

7. The flexible shipping bag of claim 6 wherein said advertising is a logo of the shipper.

8. The flexible shipping bag of claim 1 wherein seams, formed by stitching, are configured to span a bottom gusset and extend to the open top and be invisible when the shipping bag is turned inside out to form a tote bag.

9. The flexible shipping bag of claim 8 further comprising an peel and stick self adhesive strip on the inner wall of one sealing flap covered by one or more removable tabs which when said tabs are removed permit joining the sealing flaps to close the shipping bag.

10. The flexible shipping bag of claim 9 wherein said peel and stick self adhesive strip is applied at the topmost position on one of the sealing flaps so that the recipient of the package can open the package by cutting the sealing flaps below said tape peel and stick self adhesive strip.

* * * * *

UNITED STATES PATENT AND TRADEMARK OFFICE
CERTIFICATE OF CORRECTION

PATENT NO. : 7,581,886 B2 Page 1 of 1
APPLICATION NO. : 11/162811
DATED : September 1, 2009
INVENTOR(S) : Robert Anthony Nitti It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Fourteenth Day of September, 2010

David J. Kappos
*Director of the United States Patent and Trademark Office*